X. SIMON.
Velocipede.
No. 94,039.
2 Sheets—Sheet 1.
Patented Aug. 24, 1869.
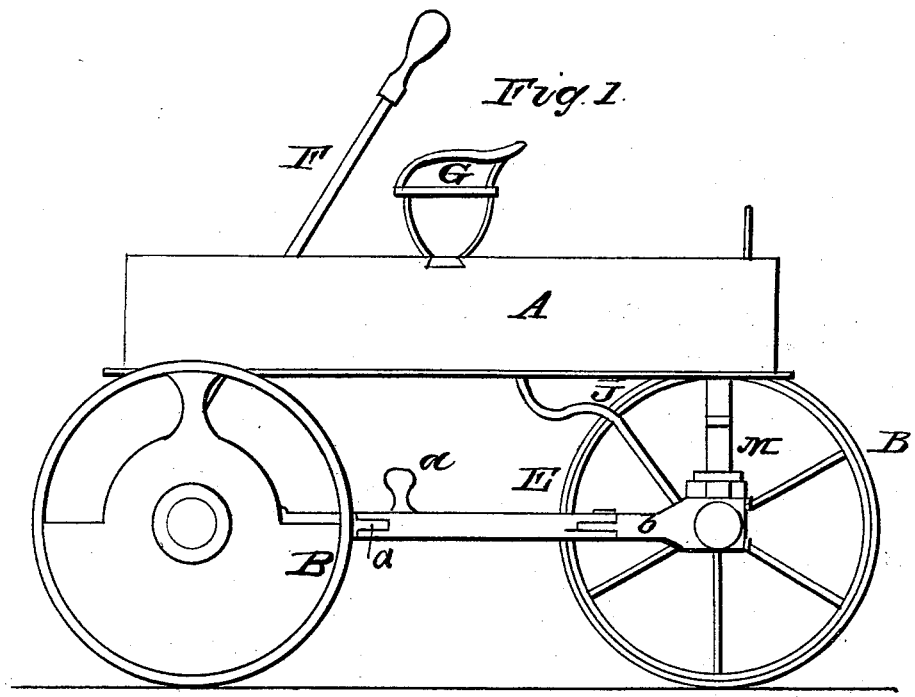
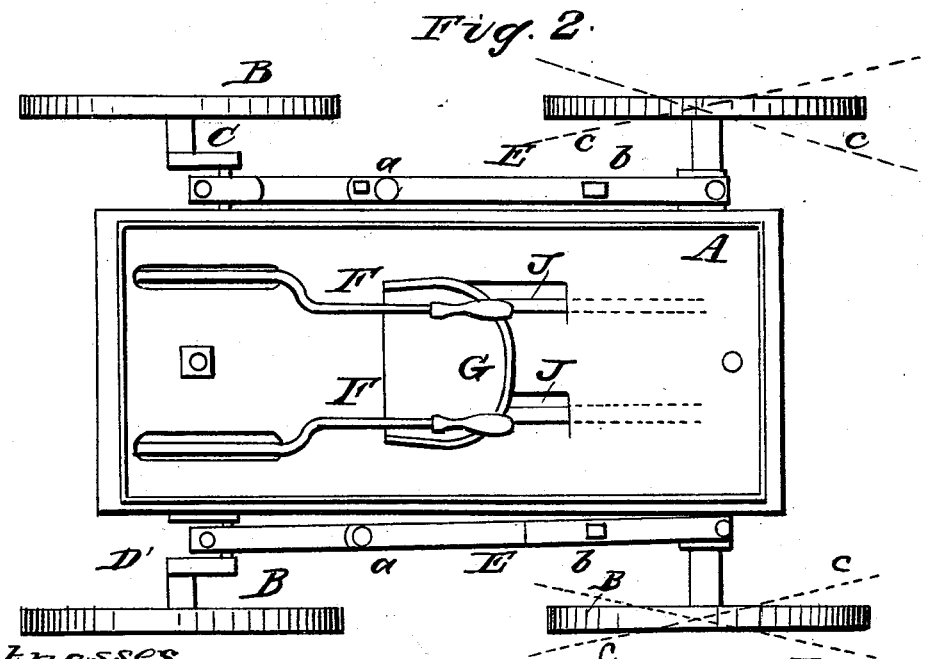
Witnesses
J. H. Burridge
E. E. Waitt
Inventor
Xavier Simon X. SIMON.
Velocipede.

No. 94,039.

2 Sheets—Sheet 2.

Patented Aug. 24, 1869.

Witnesses
J. H. Burridge
E. E. Wart

Inventor
Xaver Simon

United States Patent Office.

XAVIER SIMON, OF AKRON, OHIO.

Letters Patent No. 94,039, dated August 24, 1869.

IMPROVEMENT IN VELOCIPEDES.

The Schedule referred to in these Letters Patent and making part of the same.

*To all whom it may concern:*

Be it known that I, XAVIER SIMON, of Akron, in the county of Summit, State of Ohio, have invented certain new and useful Improvements in Invalids' Wagon; and I do hereby declare that the following is a full and complete description of the same, reference being had to the accompanying drawing, making part of this specification, in which—

Figure 3:
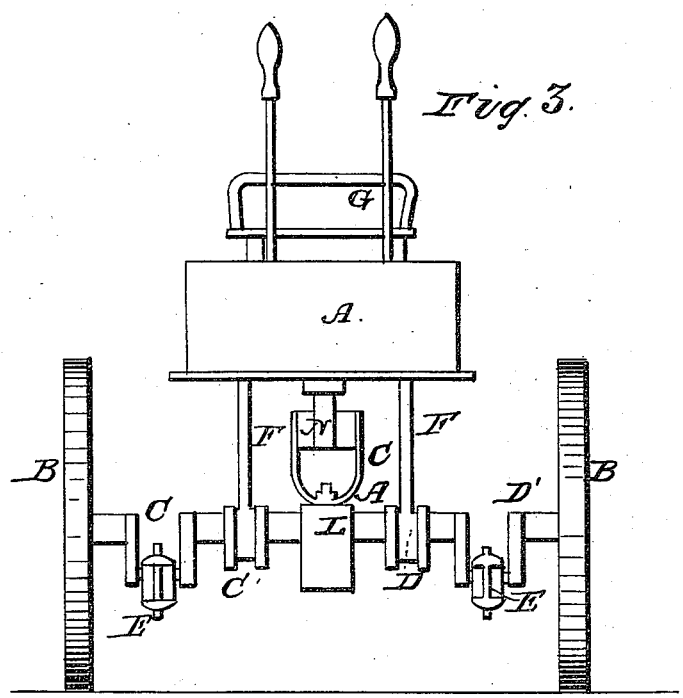
Figure 4:
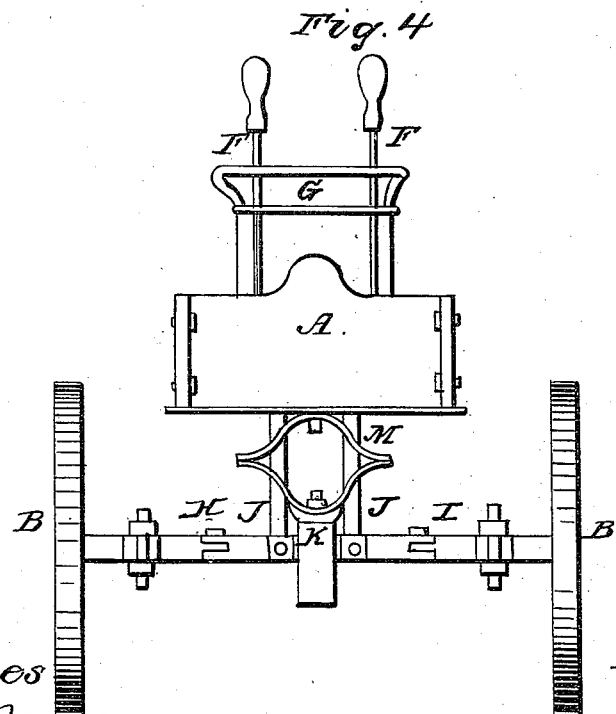

Figure 1 is a side view of the wagon.
Figure 2, a view of the top.
Figure 3, a view of the front.
Figure 4, a view of the rear end.

Like letters of reference refer to like parts in the several views.

This invention has for its object a wagon so constructed that it is propelled and guided by the person sitting therein, by means of the hands and feet, as hereinafter more fully described.

In fig. 1, A represents the body or box of the wagon mounted upon the wheels B B'.

The front wheels B are secured rigidly to the axle-tree A', whereas the hind wheels are free on the axle-tree C', and revolve thereon in the ordinary way.

The front axle-tree is so constructed as to consist of two pairs of cranks, C C' and D D', fig. 3, one pair on each side of the centre, and arranged at right angles to each other in duplicate form.

To each of the outer cranks C and D' is attached one end of the jointed links E, whereas the opposite ends are connected to the hind axle-tree, as shown in fig. 4.

To the cranks C' and D is attached one end of the rods F, fig. 3.

Said rods, as will be observed, project upward through the bottom of the box to within convenient reach of the seat G, on which the operator sits.

The links E, as above said, are jointed, there being two joints in each link at the points *a* and *b*, whereby a flexible character is obtained to them, the purpose of which will presently be shown.

The hind axle-tree C' is provided with two joints H I, fig. 4, whereby the wheels thereon may be turned to the right or to the left, for guiding the vehicle, the same being operated by the feet of the rider pressing upon or against the levers J, one end of which being connected to the axle-tree, whereas the opposite end is projected through the bottom of the box, near the feet of the rider.

The box or body of the wagon is attached to the axle-trees by the intervention of movable blocks L K, figs. 3 and 4, secured to each axle-tree at the centre, the box resting upon a spring, M, interposed between the blocks and box at the rear end, and the front end by a stud, N, pivoted in the stay O, interposed between the movable block L and stud, as shown in fig. 3.

Having thus described the several parts of the vehicle and their arrangement, the practical operation of the same is as follows:

The rider takes his place on the seat G, and with each hand grasps a handle of the rods F. Now, on alternately pulling and pushing the rods, the crank-axle is turned, thereby communicating motion to the wheels B, whereby they are moved forward. At the same time is given to them and the box a reciprocating or alternating progressive movement. Thus the front wheels, as they revolve, move toward and recede from the hind ones.

By this combination of cranks and connections, the carriage is easily propelled, with much less physical force than if driven without the double-crank and axle-connection, in the manner as described.

The vehicle is guided by the hind wheels, and which are operated laterally by the foot-levers J attached to the jointed axle-tree. Thus, on removing the pin *a*, fig. 1, from the joint of the link, whereby it and the jointed axle-tree are made rigid, the wheels can be turned either way in a lateral direction, as indicated by the dotted lines *c*, fig. 2, by the flexible or jointed character of the axle-tree, operated by the rider's feet on the levers J, as above said.

By this means, the carriage can be run around abrupt corners, or in whatever direction the rider may wish to go.

What I claim as my invention, and desire to secure by Letters Patent, is—

1. The combination and arrangement of the crank-axle-tree A', jointed links E, jointed axle-tree C', levers J, and actuating-rods F, in the manner substantially as described and for the purpose specified.

2. The stud N, stay O, movable blocks L, axle-tree A', and box A, all combined and arranged to operate in the manner as and for the purpose set forth.

XAVIER SIMON.

Witnesses:
J. H. BURRIDGE,
E. E. WAITE.